May 27, 1947.　　　A. L. BABCOCK　　　2,421,002

TENSILE STRENGTH TESTING APPARATUS

Filed April 23, 1945　　　2 Sheets-Sheet 1

INVENTOR.
ALBERT L. BABCOCK
BY
ATTORNEY

May 27, 1947.  A. L. BABCOCK  2,421,002
TENSILE STRENGTH TESTING APPARATUS
Filed April 23, 1945  2 Sheets-Sheet 2
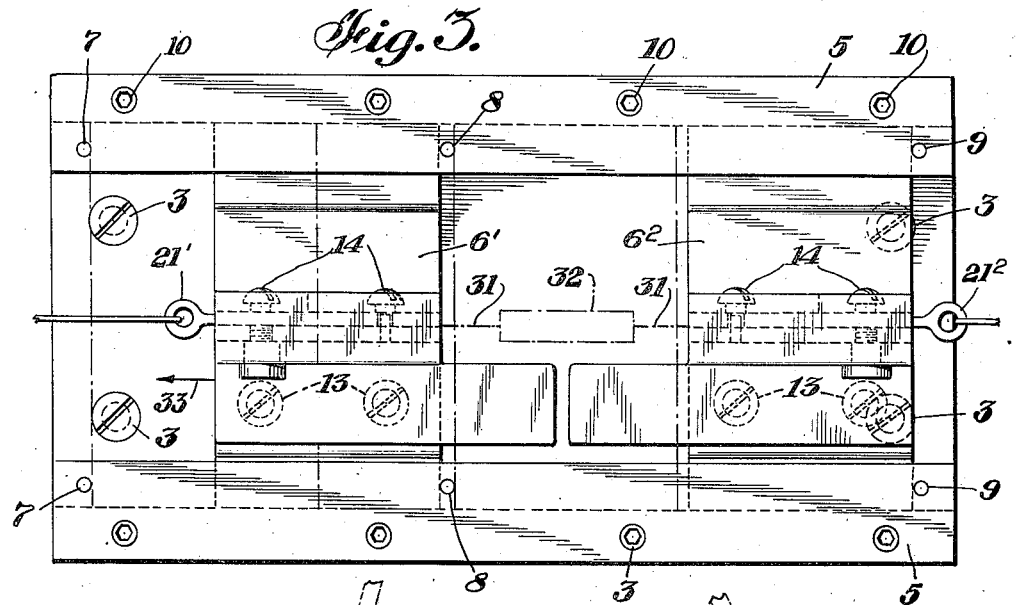
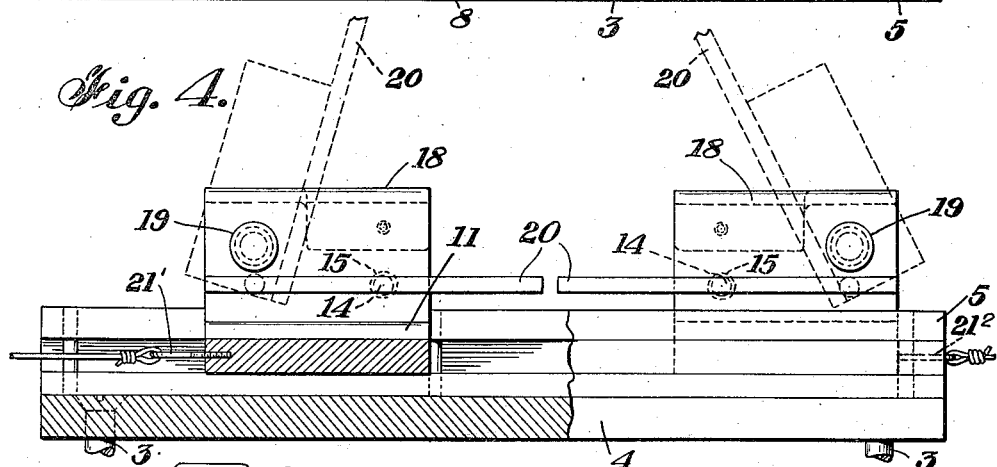
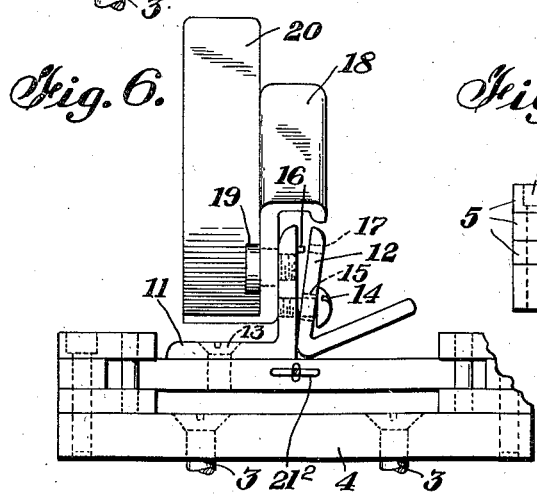
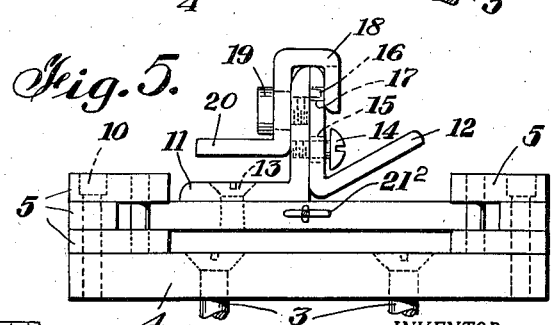
INVENTOR.
ALBERT L. BABCOCK
BY
ATTORNEY Patented May 27, 1947

2,421,002

UNITED STATES PATENT OFFICE 2,421,002

TENSILE STRENGTH TESTING APPARATUS

Albert L. Babcock, Newark, N. J., assignor to Federal Telephone and Radio Corporation, New York, N. Y., a corporation of Delaware Application April 23, 1945, Serial No. 589,815

3 Claims. (Cl. 73—95)

This invention relates to a tensile strength testing apparatus and more particularly to an apparatus for testing the quality of welding or soldering of lead wires for small crevices such as dry rectifier elements.

Since it is essential that the welded contacts of the leads for electrical apparatus have a long life of service, various devices have been provided for testing such connections.

It is the object of the present invention to provide a simple and efficient welding strength testing apparatus which enables the testing of the welding connection for a certain predetermined strength.

It is a further object of the present invention to actuate the testing device either manually or preferably pedally.

With these and other objects in view the present invention will become apparent and clearly understood in connection with the accompanying drawings, in which:

Fig. 3 is a plan view of the apparatus on enlarged scale;

Fig. 4 is a partly sectional elevational view of the apparatus;

Fig. 5 is a side view of the apparatus shown in operative clamped position, and

Fig. 6 is a side view of the apparatus shown in inoperative position.

Figure 1:
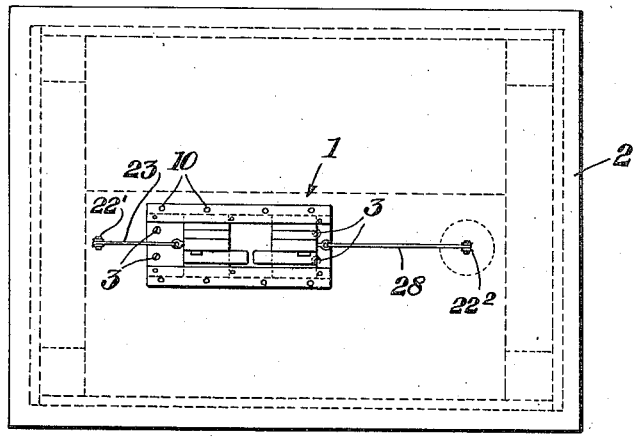
Figures 1 and 2 are plan and elevational views of the apparatus and frame.
Figure 2:
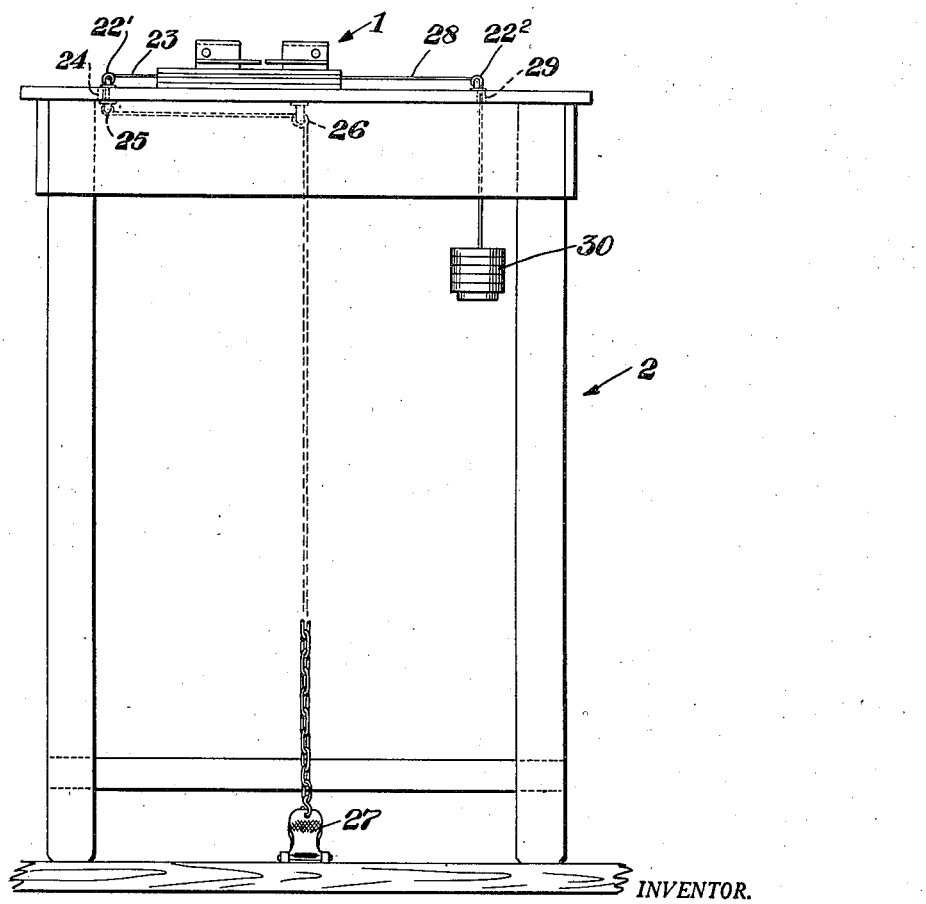

Referring now to the drawings the apparatus 1, according to the present invention, is supported by a table-like frame 2 and fastened to the table 2 by screw bolts 3.

The apparatus 1 comprises a base 4, mounted on the top of the table 2, which base 4 carries two parallel arranged U-brackets 5. Two slides $6^1$ and $6^2$ glide along the U-brackets 5 and the movement of the two slides is limited between pairs of pins 7, 8 and 9 which are arranged opposite each other in each of the U-brackets 5. Slide $6^1$ is allowed to move between the pins 7 and 8 and slide $6^2$ between the pins 8 and 9.

The U-brackets 5 are secured to the base 4 by a number of screw bolts 10.

Each one of the slides $6^1$ and $6^2$ carries a pair of angle members 11 and 12, the angle members 11 being fastened to the slides $6^1$ and $6^2$ respectively, by means of screw bolts 13 so that they are movable with these slides. Whereas the angle member 11 has its branches arranged at an angle of 90°, the angle member 12 has its branches at an angle of somewhat less than 90°. Another screw bolt 14 carried by the upper branch of the angle member 11 and penetrating a hole 15 of the upper branch of the angle member 12 holds the angle member 12 in loose connecting position with the angle member 11 so that the upper branches of the angle members 11 and 12 provide an open space between them in the inoperative position of the apparatus. The upper branch of the angle member 11 may be equipped near its upper end with a small pin 16 and the upper branch of the angle member 12 may be equipped on the same level with a corresponding hole 17 which is adapted to receive the pins 16.

Each angle member 11 is further equipped with a clamp 18 which is turnably connected by means of another screw bolt 19 or the like with the upwards extending branch of the angle member 11. The clamp 18 is adapted to be turned over and to clamp the two upwards extending branches of the angle members 11 and 12 and, therefore, the inner width of the clamp 18 is slightly larger than the thickness of the two upper branches of the angle members 11 and 12. Handles 20 are integrally formed with the clamps 18 in order to lift or lower the clamps 18 from or upon the angle members 11 and 12 without using great force.

The outer ends of the slides $6^1$ and $6^2$ carry eye bolts $21^1$ and $21^2$. Pulleys $22^1$ and $22^2$ are mounted on top of the table 2 on each side of the apparatus 1 and a string or chain 23, one end of which is connected with the eye bolt $21^1$, runs over the pulley $22^1$ and then through a hole 24 in the table 2 over a pulley 25 and pulley 26 to a foot treadle 27 which is mounted on the base of the frame 2. The pulleys 25 and 26 are mounted on the underside of the top of the table 2. Another string or chain 28 is connected with the eye bolt $21^2$ of the slide $6^2$ and runs over the pulley $22^2$ through another hole 29 in the top of the table. The end of the string or chain 28 carries a predetermined weight 30.

The apparatus according to the present invention works in such a way that the lead wires 31 of the rectifier element 32 are clamped between each group of angle members 11 and 12 and then exposed to the stress of any predetermined weight. In order to stress the lead wires 31 it is first necessary to move both slides to their most extreme positions, namely so far to the right that the slide $6^1$ abuts the pins 8 and slide $6^2$ abuts the pins 9. This arrangement is necessary with the assumption that the foot treadle 27 is connected with the left slide $6^1$ of the apparatus, whereas the right slide $6^2$ is connected through the eye bolt $21^2$ with any predetermined weight 30. After the two slides $6^1$ and $6^2$ are brought to their proper positions, first one wire 31 is inserted between the upper branches of the angle members 11 and 12 of the slide $6^1$. In order to provide an anchorage for the inserted wire the pin 16 is arranged on the angle member 11. When the wire is thus inserted, the clamp 18 mounted on slide $6^1$ is turned down by pushing the handle 20 thereby clamping together the upper branches of the angle members 11 and 12 and at the same time pressing between them the lead wire 31. Essentially the same procedure is now done with the right hand lead wire 31 which is then clamped between the angle members 11 and 12 mounted on the slide $6^2$. After having now the rectifier element clamped between the two groups of angle members 11 and 12 through its lead wires 31, the treadle 27 is operated and thereby the slide $6^1$ is moved to the left in the direction of the arrow 33. By this movement the right slide $6^2$ will also be moved in the same direction and the lead wires and their welded connections with the rectifier element 32 form the only connecting means between the slides $6^1$ and $6^2$ exposed to the predetermined weight pulling on slide $6^2$. It has been found that for the purpose of these small rectifier elements 32 a weight of three pounds is sufficient, since this is about the maximum stress to which the welded connections are subjected. During the testing operation the slides $6^1$ and $6^2$ move to the left side until they abut the pins 7 and 8, respectively. During this travel the welded connections of the lead wires 31 working as the connecting means between slides $6^1$ and $6^2$ carry the whole weight 30. Upon releasing the foot treadle 27 the slides $6^1$ and $6^2$ will return to their original positions. The clamps 18 can then be lifted again by means of their handles 20 and the rectifier element and its wires 31 easily removed and a new rectifier element for the next test be inserted.

While I have disclosed the principles of my invention in connection with one specific embodiment, it will be understood that this embodiment is given by way of example only and not as limiting the scope of the invention as set forth in the objects and the appended claims.

What I claim is:

1. In an apparatus for testing the tensile strength of an element, oppositely positioned movably mounted means for respectively clamping the ends of said element, said element serving as the connecting means between said clamping means, means for pulling one of said clamping means in one direction and means for exerting a predetermined constant force on the other of said clamping means immediately upon moving of said first clamping means in the opposite direction.

2. In an apparatus for testing connecting joints of at least two lead wires extending from an electrical element, a base, guides fastened to said base, two clamping means mounted for sliding movement in said guides and for clamping the ends of said lead wires such that said wires with said element serve as the connecting means between said clamping means, means for limiting the movement of one of said clamping means in one direction, means for limiting the movement of both of said clamping means in the opposite direction, means for moving one of the said clamping means in the said one direction, and means exerting a predetermined constant force on the other clamping means immediately upon moving of said one clamping means in said opposite direction.

3. In an apparatus as set forth in claim 2, said moving means comprising a treadle and a connecting means between one of said clamping means and said treadle, said force exerting means comprising a weight and a connecting means between the other of said clamping means and said weight.

ALBERT L. BABCOCK.

REFERENCES CITED

The following references are of record in the file of this patent:

UNITED STATES PATENTS

| Number | Name | Date |
|---|---|---|
| 464,766 | Wendler | Dec. 8, 1891 |
| 598,205 | McKnight | Feb. 1, 1898 |
| 1,255,936 | Scott | Feb. 12, 1918 |
| 1,991,854 | Johansson | Feb. 19, 1935 |
| 2,065,359 | Sachmeister | Dec. 22, 1936 |
| 2,327,139 | Scott | Aug. 17, 1943 |
| 1,817,617 | Gosch | Aug. 4, 1931 |
| 1,749,297 | Norman | Mar. 4, 1930 |